United States Patent [19]

Erwin et al.

[11] 4,323,044
[45] Apr. 6, 1982

[54] ENGINE FUEL VAPORIZING DEVICE AND SYSTEM

[76] Inventors: William L. Erwin, 1506 Barbara, Irving, Tex. 75060; Addison B. Chamness, Jr., 2231 Lovers La., Dallas, Tex. 75235

[21] Appl. No.: 177,204

[22] Filed: Aug. 11, 1980

[51] Int. Cl.³ .............................................. F02M 31/00
[52] U.S. Cl. .................................. 123/557; 123/25 F; 123/198 A
[58] Field of Search .................. 123/525, 25 B, 25 D, 123/25 F, 557, 558, 198 A

[56] References Cited

U.S. PATENT DOCUMENTS

| | | | |
|---|---|---|---|
| 1,728,323 | 9/1929 | Bartley | 123/557 |
| 3,509,859 | 5/1970 | Pantano | 123/557 |
| 3,968,775 | 7/1976 | Haspman | 123/25 F |
| 4,103,658 | 8/1978 | Bernecker | 123/557 |
| 4,151,821 | 5/1979 | Wichman | 123/557 |

*Primary Examiner*—Ronald H. Lazarus
*Attorney, Agent, or Firm*—Peter J. Murphy

[57] ABSTRACT

A fuel charging device includes a housing having two transverse bores, one defining a mixing chamber and one defining a vaporizing chamber. A section of exhaust bypass conduit passes through the vaporizing chamber bore to provide an annular chamber. A plurality of fuel flow channels consist essentially of transverse bores intersecting the vaporizing chamber and mixing chamber bores. These fuel flow channels include a valve chamber, a feed chamber communicating the valve chamber and the vaporizing chamber, and passages communicating the vaporizing chamber and the mixing chamber. Metering valves include valve orifices disposed between the valve chamber and the feed chamber, and needle valves at the end of valve actuator stems which extend through the valve chamber and beyond the housing. Liquid fuel inlet passages communicate with the valve chambers. The valves are reciprocated by a bell crank assembly and associated linkage, with adjustments to vary the positions of the needle valves relative to the valve orifices. The vaporized fuel is conveyed by a conduit connecting the mixing chamber with the fuel-air mixing control at the engine; and the charging device valves are coupled to the throttle valve at the engine by suitable linkage for simultaneous operation.

8 Claims, 5 Drawing Figures

ENGINE FUEL VAPORIZING DEVICE AND SYSTEM

This invention relates to a device for vaporizing fuel, for use with internal combustion engines.

An object of this invention is to provide an improved device for completely vaporizing one or more fuel liquids supplied to an internal combustion engine, thereby providing improved engine efficiency and fuel economy.

Another object of this invention is to provide an improved device for supplying a selected mix of a plurality of fuel liquids, vaporizing that mix and supplying same to an engine.

A further object of this invention is to provide a device for varying the quantity of a vaporized fuel mix supplied to an engine, in response to the throttle setting of the engine.

A more particular object of this invention is to provide a device for varying the quantity of fuel liquids to be vaporized and supplied to the engine, in response to throttle setting.

Still another object of this invention is to provide a device including means for selecting the proportions of a plurality of fuel liquids making up the fuel mix to be supplied to the engine.

A still further object of this invention is to provide a device utilizing heat from the engine exhaust gases to completely vaporize the fuel mix supplied to the engine.

Another object of this invention is to provide a system including a device for completely vaporizing one or more fuel liquids, means for mixing the vaporized fuel liquids with combustion air, and control means for varying the supply of fuel liquids to be vaporized in relation to the throttle setting of the engine.

These objects are accomplished in a fuel charging device for an internal combustion engine having an intake manifold and a fuel-air throttle control at the intake manifold. The fuel charging device includes a housing having a vaporizing and mixing chamber, and means for connecting a vaporized fuel conduit to the mixing chamber for conveying fuel to the intake manifold of the engine. The housing also has a plurality of fuel flow channels, each of which comprises: a fuel liquid inlet passage, a valve chamber, a feed chamber communicating the valve chamber with the vaporizing chamber, and means for connecting a fuel liquid supply conduit to the inlet passage. A metering valve is disposed in each of the valve chambers, each metering valve including an actuator stem projecting from the housing. Actuator means are connected to the valve stems for controlling the operation of the valves; and these actuator means are adapted for connection to the engine throttle control for simultaneous operation therewith. The charging device includes heat exchange means in the vaporizing chamber, including exhaust gas conduit means for connection to the exhaust system of an engine.

More particularly, the system includes a vaporized fuel conduit connecting the mixing chamber of the fuel charging device to the engine. The fuel air throttle control is coupled to the actuator means for the charging device valves, so that the amount of fuel admitted to the vaporizing chamber for transmittal to the engine is controlled simultaneously with the amount of combustion air admitted to the engine.

DRAWINGS

DESCRIPTION OF THE PREFERRED EMBODIMENTS

Figure 1:
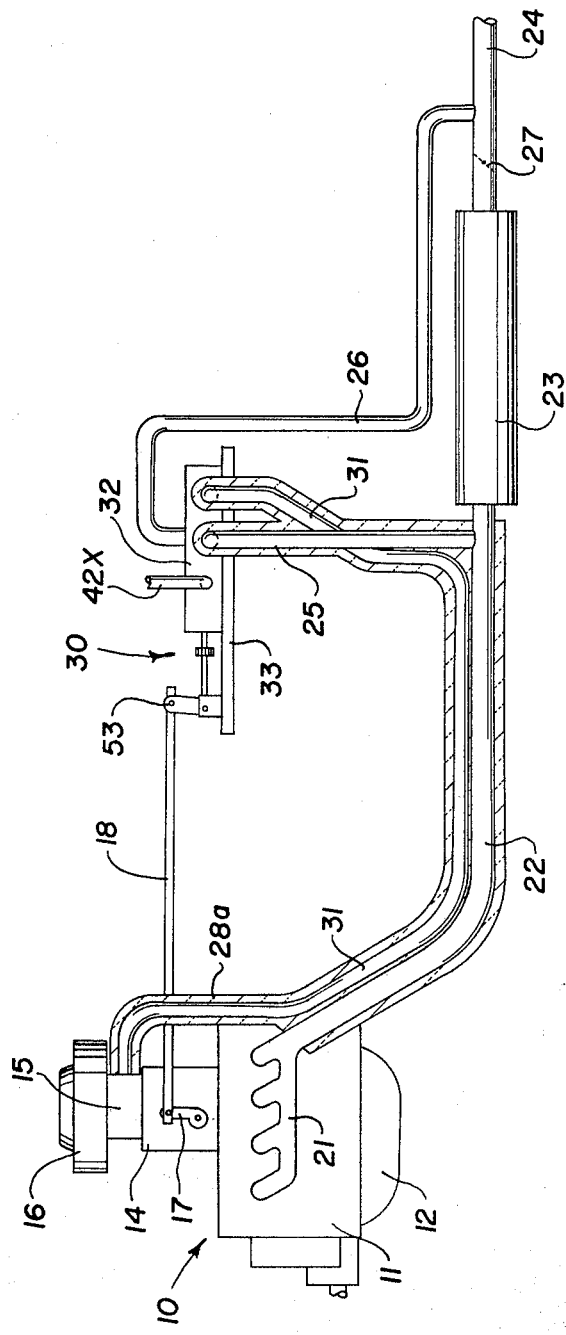
FIG. 1 is a diagrammatic view of one form of system according to the invention.

FIG. 1 of the drawing is a diagrammatic illustration of one form of engine system according to the invention, which incorporates a fuel charging and vaporizing device which is a particular aspect of the invention. This system includes an engine 10 which is a generally conventional engine of the type which burns liquid gasoline fuel, with the exception that it does not include a carburetor. For the purpose of describing the invention, the components of this engine include the engine block 11, oil pan 12, fuel-air mixing device 14, fuel inlet adapter 15, and air cleaner 16. The fuel-air mixing device may include a conventional throttle valve (not shown) and throttle valve control arm 17. The conventional components of the engine exhaust system include an exhaust manifold 21, exhaust pipe 22, muffler 23, and tail pipe 24.

An important component of the system is the fuel charging and vaporizing device, referred to hereafter as the fuel charging module 30. This module, to be described in detail subsequently, receives one or more fuel liquids and controls the metering, vaporizing and mixing of the fuel liquids for charging the engine through the inlet adapter 15. This fuel charging module is controlled by a link arm 18 which is coupled to the control arm 17 of the engine fuel-air mixing device 14 and these are both actuated by a suitable engine speed or throttle control manipulated by the engine operator.

The fuels in the fuel charging module 30 are vaporized by heat supplied by the exhaust system. The exhaust gases are diverted from the exhaust pipe 22 through the module 30 by an exhaust bypass pipe including inlet and outlet portions 25 and 26 respectively. The outlet portion is connected to the tail pipe 24. A damper valve 27 may be provided in the tail pipe, between the muffler and the outlet bypass connection, particularly to divert more of the exhaust gases through the module 30 during engine warm-up to provide the necessary vaporizing heat to the module. A vaporized fuel line 31 connects the module 30 with the inlet adapted 15; and this fuel line passes in close heat exchange relation with the portion inlet bypass 25, the exhaust pipe 22 and the exhaust manifold 21 to maintain the fuel line at a sufficiently high temperature to prevent any recondensation of the vaporized fuel passing through that line. To further maintain the temperature of the fuel line, the line and the associated portions of the exhaust system are enclosed in a common heat insulating shroud 28; and an associated insulating shroud 28a encloses the fuel line between the shroud 18 and the adapter 15.

In the above described system, the fuel charging module 30 may be placed in any desired location, either in close proximity to the engine 10 or possibly more remote. While this system may be used for any internal combustion engine, it is described for use with an automobile engine; and the system is designed that it may be added to an existing automobile, as well as being incorporated in initial design. When the system is added to an existing automobile, some modification of the existing carburetor will be required, particularly to render ineffective the existing fuel supply functions of that carburetor.

Figure 2:
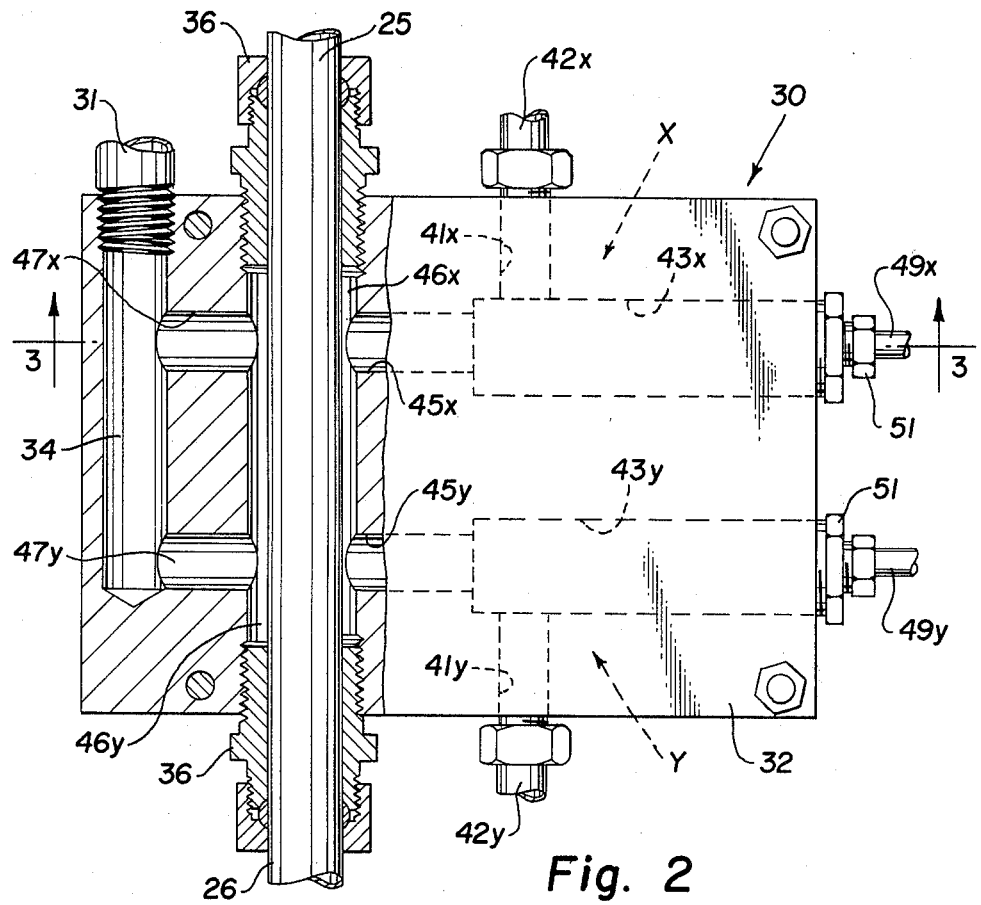
FIG. 2 is a plan view, partially in section, of an engine fuel mixing device according to the invention.
Figure 3:
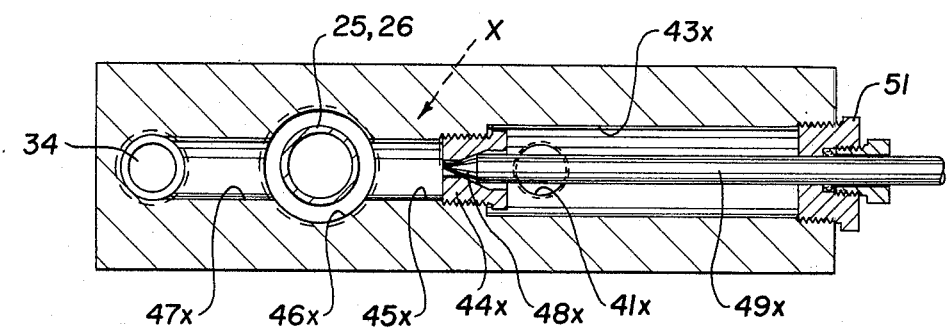
FIG. 3 is a sectional view taken along line 3—3 of FIG. 2.
Figure 4:
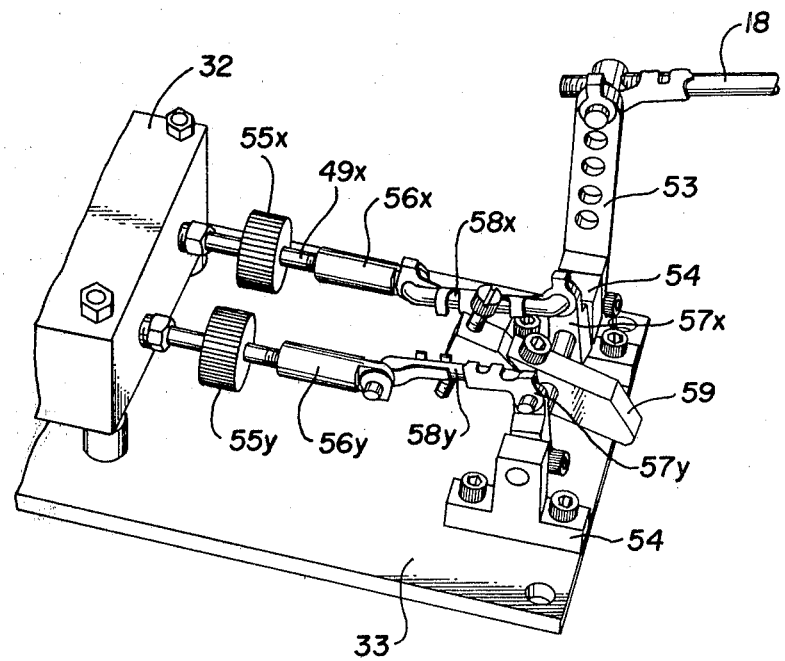
FIG. 4 is a fragmentary perspective view of the controls for the fuel mixing device.

FIGS. 2 through 4 of the drawing illustrate the fuel charging module 30 which consists of a housing 32 mounted on a suitable base plate 33, the base plate also supporting certain controls of the module. The housing is flat and rectangular, and may have some cooling fins provided on at least one surface. The housing is provided with a transverse bore adjacent to one end defining a mixing chamber 34, and a second transverse bore adjacent thereto which defines vaporizing chambers to be described. A bypass exhaust pipe 25, 26 passes through this vaporizing chamber, to supply the vaporizing heat.

The fuel charging module is designed to supply and mix a plurality of fuel liquids, with a mixture of vaporized fuel liquids then being fed to the engine through the vaporized fuel line 31, which is suitably coupled to the outlet of the mixing chamber 34. The fuel liquids may consist of combustible fuels and/or fuel additives; examples of combustible fuels being gasoline and diesel fuel, and examples of additives being water and alcohol. The illustrated module 30 provides two fuel channels X and Y; and the several parts and associated components of these fuel channels are identified by reference numbers with the subscripts x and y respectfully.

The fuel flow channel X, which may be the channel for liquid gasoline for example, consists of an inlet chamber 41x to which is coupled a supply conduit 42x, a valve chamber 43x in which is mounted a metering orifice 44x, a feed chamber 45x communicating the metering orifice with a vaporizing chamber 46x, and a passage 47x communicating the vaporizing chamber with the mixing chamber 34. A tapered metering valve 48x is disposed at one end of a valve stem 49x which projects from the housing at the end of the valve chamber remote from the metering orifice.

The fuel channel Y may be provided for alcohol or water for example, and includes similar components designated by the subscript y.

Since the fuel liquids will be supplied under pressure from a suitable pump to the respective valve chambers, suitable packing glands 51 are provided at the outer ends of the valve chambers to seal the valve stems 49x and 49y which are reciprocated, as will be described, to control the quantity of fuel liquids supplied through the respective metering orifices. Suitable sealing glands 36 are provided at the opposite ends of the transverse passage which defines the vaporizing chambers 46x and 46y to seal the exhaust bypass pipe which passes through the transverse chamber.

The control mechanism for the valves includes a bell crank 53 consisting of a transverse shaft, journaled in suitable end bearing 54 and a radial arm which is coupled to the link arm 18 so that the operator mechanism functions jointly with the throttle control. The projecting ends of the valve stems 49x and 49y are provided with threaded ends, and are further provided with adjustment knobs 55x and 55y nonrotatably fixed to these stems to enable the threading of the stems into adjustment sleeves 56x and 56y. Radially projecting control arms 57x and 57y are non-rotatably fixed to the shaft of the bell crank 53; and these arms are coupled to the adjustment sleeves by means of respective control links 58x and 58y.

An adjustable stop arm 59 is non-rotatably mounted on the shaft of the bell crank to limit the oscillation of the bell crank and associated mechanism in a direction to close the metering valve.

It will be seen that oscillation of the bell crank, by means of the link arm 18, will effect reciprocation of the valve stems 49x and 49y; and this will of course vary the positions of the tapered valves 48x and 48y relative to the respective valve orifices 44x and 44y to control the amount of liquid fuels which pass to the vaporizing and mixing chambers. The adjusting knobs are provided to adjust the positions of the valves in relation to the position of the bell crank, and also in relation to each other to provide for the proper proportioning of the two fuel liquids.

With respect to overall engine operation, when the throttle valve is opened to allow a larger volume of intake air into the engine, a larger volume of vaporized fuel mixture is also drawn into the engine from the fuel charging module; and simultaneously with the opening of the throttle valve the fuel valves are opened to admit more of the liquid fuels to be vaporized, mixed and delivered to the engine.

Figure 5:
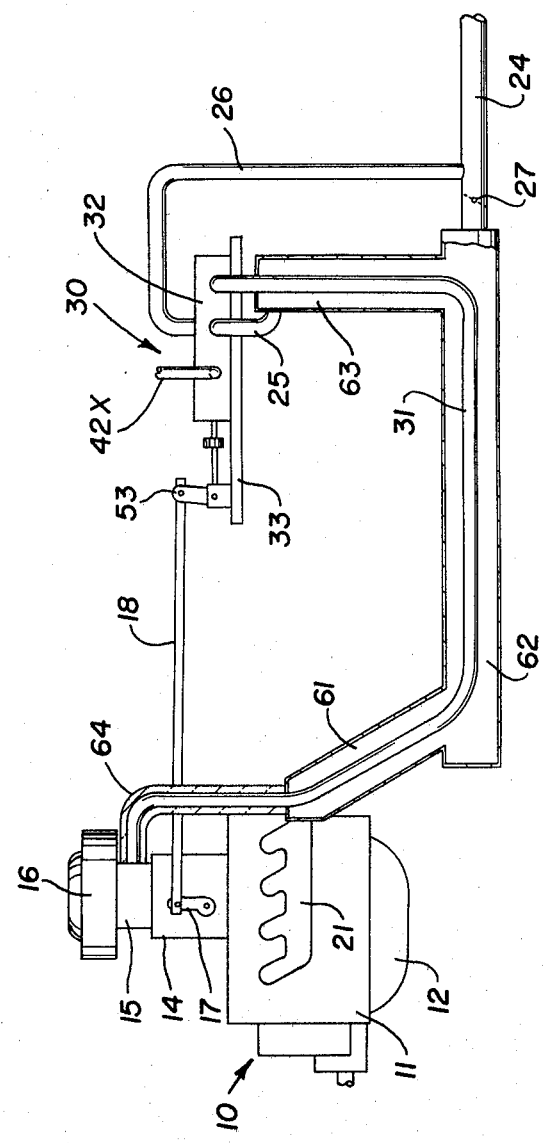
FIG. 5 is a diagrammatic illustration of an alternative form of system according to the invention.

Embodiment of FIG. 5

FIG. 5 is a diagrammatic illustration of another form of engine system according to the invention. The components of this system which are identical with the system of FIG. 1 will be identified by the same reference numbers. The system of FIG. 5 is particularly adapted to a situation where the fuel charging module 30 is located desirably at a point remote from the engine, such that the vaporized fuel line may be either incorporated in or passed through the muffler of the associated exhaust system. In an automobile application, this system would be particularly useful where it is desirable that the fuel charging module be positioned in proximity to the driver's seat, so that the vehicle driver or operator might effect manual adjustment of the module controls while the vehicle is being operated.

The engine 10 is identical to that previously described; and the fuel charging module 30 is also identical to that previously described. The link arm 18 represents extended linkage which may be in the form of a confined cable or other linkage suitable to coordinate the movements of the throttle control arm 17 and the bell crank 53 of the fuel charging module assembly.

In this system the engine exhaust manifold 21 is coupled to an exhaust pipe 61 in the form of an enlarged lateral extension of a muffler 62. The muffler 62 also includes a second lateral extension 63, rising vertically adjacent to the rearward end of the muffler. The muffler 62, and the extensions 61 and 63, if desired, may comprise conventional muffler structures such as baffles or any suitable structure to accomplish the muffling function; but are also designed to enclose sections of pipe which function as a part of the vaporized fuel line 31 in a manner that there is intimate heat exchange relation between the fuel line and the muffler structure. This relationship, of course, maintains the fuel line hot to maintain the vaporized fuel charge in that condition and prevent any condensation. The exhaust bypass line 25, 26 connects with the upper end of the muffler extension 63. The portion of the vaporized fuel line 31 which is exposed between the exhaust pipe 61 and the inlet adapter 15 is enclosed by an insulating shroud 64.

Operation

As will be apparent from the foregoing description, the fuel charging module 30 handles only fuel liquids; and the mixture of the vaporized fuel liquids with the combustion air occurs at the fuel-air mixing device 14 associated with the engine 10.

The operation of the systems of FIGS. 1 and 4 are identical. In order to utilize the systems, an auxiliary system (not shown) may be required to introduce fuel to the engine for starting purposes. Once the engine is started and sufficient vaporizing heat is available at the fuel charging module 30, the auxiliary fuel starting system may be shut off for operation of the engine by the system of this invention.

With the throttle partially open, the fuel valves 41x and 41y are also partially open, discharging selected amounts of fuel liquids through the respective feed passages to the vaporizing chambers 46x and 46y. Since these vaporizing chambers are interconnected, some mixing of the vaporized fuel liquids may occur in these chambers; and the vaporized fuels are then passed through the respective passages 47x and 47y to the mixing chamber 34 for more complete mixing.

The vaporization of the fuel liquids will create substantial pressure increase within the fuel charging module; and this increase in pressure coupled with the reduced pressure or vacuum created by the action of the engine cylinders will draw the vaporized fuel through the vaporized fuel line 31 and engine inlet adapter 15. In the fuel-air mixing device 14, the vaporized fuel and combustion air will be mixed together to provide the desired combustion mixture to the engine cylinders.

With the systems described, sufficient heat is available at the fuel charging module to completely vaporize the fuel liquids; and with the vaporize fuel line 31 maintained in the heat exchange relation with the exhaust systems, as described, the fuel will be maintained in the completely vaporized state for complete and thorough mixture with the combustion air at the fuel-air mixing device 14.

When the throttle control arm 17 is operated to either open or close the throttle valve a corresponding operation of the charging module bell crank 53 occurs to change the amount of fuel liquids supplied to the vaporizing chambers and then to the engine.

Features and Advantages

What has been described is a unique system for completely vaporizing one or more fuel liquids for subsequent mixture with combustion air drawn into the engine. A feature of the invention is that a variable supply of vaporized fuel liquids is provided in relation to the engine throttle setting.

An important feature of the invention is a fuel charging module for feeding different quantities of a plurality of fuel liquids into the engine, and which plurality of fuel liquids are completely vaporized and mixed together for feeding into the engine and later mixed with the combustion air. Another important feature of the invention is that the fuel charging module utilizes heat solely from the engine exhaust system to completely vaporize the fuel liquids.

While the preferred embodiments of the invention have been illustrated and described, it will be understood by those skilled in the art that changes and modifications may be resorted to without departing from the spirit and scope of the invention.

What is claimed is:

1. A fuel charging device for an internal combustion engine having an intake manifold and a fuel-air throttle control at the intake manifold, said device comprising:
   a housing having means defining a vaporizing and mixing chamber, and means for connecting a vaporized fuel conduit to said mixing chamber for conveying fuel to said engine;
   said housing having a plurality of fuel flow channels;
   each of said channels comprising: a fuel liquid inlet passage, a valve chamber communicating with said inlet passage, a feed chamber communicating said valve chamber with said vaporizing chamber, and means for connecting a fuel liquid supply conduit to said fuel liquid inlet passage;
   metering valve means disposed in each of said respective valve chambers, each including an actuator stem projecting from said housing;
   actuator means connected to said valve stems for controlling the operation of said valve means, adapted for connection to the engine throttle control;
   and heat exchange means in said vaporizing chamber, including exhaust gas conduit means for connection to the exhaust system of said engine.

2. A fuel charging device as set forth in claim 1 said vaporizing chamber comprising a bore extending through said housing, a portion of an exhaust bypass conduit passing through said bore, said conduit having a cross section smaller than that of said bore to provide an annular chamber surrounding said conduit, and means for sealing said conduit at the ends of said bore to close said vaporizing chamber.

3. A fuel charging device as set forth in claim 2 said housing having a second transverse chamber generally parallel to said vaporizing chamber, defining a mixing chamber; said vaporized fuel conduit being connected to said mixing chamber;
   and passage means communicating said vaporizing and mixing chambers; said passage means being parts of said fuel flow channels.

4. A fuel charging device as set forth in claim 1 said valve means including a metering orifice, disposed between said valve chamber and said feed chamber, and a needle valve disposed at one end of a reciprocable actuator stem;
   said actuator means including a bell crank journaled about an axis perpendicular to the axes of said valve actuator stems, operator arms non-rotatably mounted on said bell crank, and link means coupling said operator arms to respective valve actuator stems.

5. A fuel charging device as set forth in claim 4 each of said valve actuator stems including a sleeve extension threadedly mounted thereon; said sleeve extensions being coupled to said actuator means coupling links; and said valve stems including knob means to enable rotation of said stems relative to said sleeves, to adjust the positions of said needle valves relative to said valve orifices.

6. A fuel charging device as set forth in claim 1 in combination with an internal combustion engine having an intake manifold, a fuel-air throttle control at the intake manifold, and an exhaust conduit;

said vaporized fuel conduit being connected between said charging device mixing chamber and said engine fuel-air throttle control;
said heat exchange exhaust gas conduit means being connected
to said engine exhaust conduit.

7. An engine system as set forth in claim 6
said vaporizing chamber comprising a bore extending through said housing, a portion of an exhaust bypass conduit passing through said bore, said conduit having a cross section smaller than that of said bore to provide an annular chamber surrounding said conduit, and means for sealing said conduit at the ends of said bore to close said vaporizing chamber.

8. An engine system as set forth in claim 7
said housing having a second transverse chamber generally parallel to said vaporizing chamber, defining a mixing chamber; said vaporized fuel conduit being connected to said mixing chamber;
and passage means communicating said vaporizing and mixing chambers; said passage means being parts of said fuel flow channels.

* * * * *